Patented Oct. 30, 1951

2,573,489

UNITED STATES PATENT OFFICE 2,573,489

FORMALDEHYDE-DICYANDIAMIDE POLY-HYDROXYPROPYLENE - POLYAMINE REACTION PRODUCT

Alfred Rheiner and Hans Martin Hemmi, Basel, Switzerland, assignors to Sandoz Limited, Basel, Switzerland No Drawing. Application March 11, 1946, Serial No. 653,706. In Switzerland November 17, 1944

Section 1, Public Law 690, August 8, 1946
Patent expires November 17, 1964

1 Claim. (Cl. 260—70)

The present invention relates to new valuable water-soluble condensation products.

It has been found that new valuable condensation products can be prepared for instance by condensing hydroxylated derivatives possessing amino and imino groups or their salts, preferably in presence of salts of nitrogen containing inorganic or organic bases, with aldehydes or compounds reacting like aldehydes, and if desired treating the condensation products thus obtained with metal salts or other suitable metallic compounds. The condensation products as such or when treated with metal salts are generally soluble in water, while giving a neutral solution. They have the property to improve to a great extent the fastness properties of dyeings produced with substantive dyestuffs on cellulosic fibres, and more particularly the fastness properties to water, to perspiration and to washing.

The hydroxylated derivatives possessing amino and imino groups used in this process can be prepared for instance by condensation of cyanamide or its polymers, of cyanuric acid, of cyanuric acid chloride, of guanidine and similar compounds with hydroxy amines or their salts. As hydroxyamines may be enumerated for example ethanolamines, the propanolamines, the hydroxyamines prepared from halogen hydrines of glycol and of glycerol or from epihalogen hydrines with ammonia or with mono- or polyvalent amines.

It is also possible to start from compounds which contain amino and imino groups, but which are free from hydroxy groups with the condition to conduct the condensation with the aldehyde in presence of at least one of the hydroxy amines or their salts mentioned above. The condensation of these compounds with the aldehyde is generally carried out in aqueous solution and at a temperature higher than room temperature. The condensation can be effected in an acid, a neutral or a slightly alkaline medium, preferably in the presence of salts of nitrogen-containing bases, like ammonium chloride, the hydrochloride of ethylene diamine or of ethanolamine and the like.

On treatment of these condensation products in presence of water with salts or compounds of copper, chromium, manganese, iron, cobalt, nickel, antimony, titanium, vanadium, tin, zinc, aluminium and the like or with mixtures of such salts or compounds complex metal compounds of the condensation products will be obtained. By introduction of one or several atoms of the metals cited above into the molecule of the condensation products, it is possible to increase their efficacy. The preparation of the metal complexes generally takes place very rapidly at room temperature, but sometimes it is preferable to work at an elevated temperature.

In the following examples, which are illustrative, the parts are by weight, the formaldehyde solution used being an aqueous solution containing 40 grs. of formaldehyde in 100 ccm. of the solution.

Example 1

19.5 parts of glycolmonochlorhydrine are introduced by portions at 35–40° C. and under good stirring into 35 parts of 27% aqueous ammonia and heated to boiling for several hours. 22 parts of the mixture of the amines obtained in this manner are heated for 1 hour at 80 to 90° C. with 3.2 parts of dicyandiamide and 12.5 parts of 40% formaldehyde. After the condensation is finished, 2.3 parts of copper formate are added to the solution which is then evaporated to dryness. A product will be obtained which is suitable for increasing the fastness properties of dyeings with substantive dyestuffs.

Example 2

26.4 parts of glycerine monochlorhydrine are slowly introduced at 50–70° C. under good stirring into 70 parts of an aqueous 25% ammonia solution. The charge is then heated to boiling for several hours. The solution thus obtained is neutralized for instance with hydrochloric acid to a pH value of 7 and condensed in the following manner—

40 parts of this solution are heated with a quantity of dicyandiamide that can vary between 2 and 11.2 parts, and with about 24 parts of 40% formaldehyde. In this manner a condensation product will be obtained which increases the fastness of substantive dyeings. By transforming this product into its copper complex, its properties will be increased.

In order to prepare the copper complex the condensation product cited above is treated for example with 5.6 parts of copper chloride at about 25–30° C. In this manner green products will be obtained which are easily soluble in water and which possess a high power to increase the fastness properties of substantive dyeings. With such products it is possible for instance to greatly improve the fastness properties to washing of substantive dyeings.

Example 3

31.2 parts of glycerine dichlorhydrine are slowly introduced under good stirring into 70 parts of 25% aqueous ammonia. The temperature rises up to 70° C. The charge is then heated to boiling and boiled for several hours in order to increase the degree of polymerisation.

44 parts of the polyamine obtained in this manner are heated for 1 hour to 90° C. with 7.2 parts of dicyandiamide and 25 parts of 40% formaldehyde. 2.8 parts of copper formate are then added to the reaction product, which is then dried in vacuo. A greenish powder easily soluble in water will be obtained. By treating substantive dyeings on cellulosic fibers with a solution containing 0.5 to 2 parts per liter of this product for about ½ hour at 70 to 90° C., the fastness of the dyeings will be greatly improved in respect to the fastness to water, to perspiration and to washing.

Example 4

258 parts of glycerin dichlorhydrine are introduced under stirring in such a manner that the temperature does not exceed 60° C., into a solution of 412 parts of diethylenetriamine in 500 parts of water. The charge is then heated for several hours at 60° C. 120 parts of the aqueous solution thus obtained are neutralized with an acid, like hydrochloric acid, to a pH value of 7 and condensed with 18 parts of dicyandiamide and 80 parts of 40% formaldehyde by heating the mixture to 70–95° C. for 1 hour. Then 12 parts of copper acetate are added thereto, the temperature being subsequently again increased for a short time and the solution thus obtained evaporated to dryness in vacuo. A green powder will be obtained which, when used even in small quantities, improves greatly the fastness properties of substantive dyeings.

Example 5

Into an apparatus provided with a reflux condenser are introduced in the following order 9.6 parts of monoethylanolamine-hydrochloride, 40 parts of water and 8.4 parts of dicyandiamide, and after having mixed the components, 21 parts of 40% formaldehyde are added. The charge is then heated slowly up to 70–95° C. in order to obtain a homogeneous charge. The charge is then kept for half an hour at this temperature and is evaporated to dryness, if necessary in vacuo. A product will be obtained which can easily be pulverized and which is very easily soluble in water. It possesses the property to improve the fastness properties to washing of substantive dyeings, when applied in appropriate manner, for example at an increased temperature and at a concentration of 2 parts per liter. This condensation product can also be used in form of its complex with metals.

It is also possible to first react the dicyandiamide with the monoethanolaminehydrochloride and to subsequently add the formaldehyde. A different product will be obtained, but its fastness improving properties are similar to the condensation product prepared as above described.

Example 6

46 parts of commercial dicyandiamide are mixed with 30 parts of water and 12.5 parts of 35% hydrochloric acid and heated to 80 to 100° C. Reaction takes place, the solution beginning to boil. When the first reaction is over 12.5 parts of 35% hydrochloric acid are added thereto and the reaction is completed by heating the charge for ½ to 1 hour to 70 to 105° C. After cooling down 8.3 parts of ethylene oxide are added thereto in order to introduce hydroxyethyl groups. The hydroxyethylation is carried out by heating the mixture from 40 to 100° C. in an autoclave. When cooled, a white product will thus be obtained, the same being composed of very fine crystals, but liquefying at a slightly elevated temperature. In the liquid state it is mixed in a vessel provided with a reflux condenser with 54.4 parts of 40% formaldehyde and the temperature increased to 60 to 105° C. The heating is continued for ½ to 1 hour. A product which is nearly white will be obtained which is dried in vacuo or in a spraying machine. It possesses the property to greatly improve the fastness properties of substantive dyeings to washing, even in presence of sodium carbonate. It can be transformed into its complex copper compound containing 5–5.5% of copper by treatment with copper acetate. After such treatments its power to fix the dyestuffs will be increased.

Example 7

In an apparatus containing a reflux condenser 46 parts of dicyandiamide are brought to reaction with 30 parts of water and with 12.3 parts of 35% hydrochloric acid in such a manner that the development of gases takes place, this being the case generally by heating the mixture to 70–105° C. After the development of gases has practically ceased, 12.3 parts of 35% hydrochloric acid are added thereto in order to start again the polymerisation reaction. The temperature is kept between 70 and 105° C. until the development of gases has ceased and heated for a further ½ hour to 1 hour. Sometimes a flocky precipitation takes place. To this charge are then added 54.4 parts of 40% formaldehyde in such a manner that it becomes possible to control and to direct the reaction of condensation in the desired manner. The charge is then stirred during 20–40 minutes at 70 to 102° C. After this time 7.9 parts of ethylene oxide are added thereto and heated during several hours in an autoclave to 50° C. In this manner a product will be obtained which can easily be dried; its properties can be increased by treating it with copper formate in such a manner, that the final product contains 4.2% of copper.

By treating substantive dyings with a solution of this product at an elevated temperature, the fastness properties of dyeings to washing, even in presence of sodium carbonate, will be increased.

Example 8

20 parts of 1 - phenylamino - 2-hydroxy-3-aminopropanehydrochloride, 8.4 parts of dicyandiamide, 25 parts of 40% formaldehyde and 50 parts of water are mixed together and heated slowly up to 60–100° C. The heating is continued for half an hour to 1 hour at this temperature. The homogeneous reaction product is dried, whereby a hygroscopic resinous product of a yellow-brownish shade will be obtained. It is easily soluble in hot water and has the property of increasing the fastness properties of substantive dyeings even to washing.

Example 9

19.5 parts of 1-amino-2-hydroxy-3-propyl-piperidinehydrochloride, 8.6 parts of dicyandiamide, 28 parts of 30% formaldehyde and 60 parts of water are mixed together and heated at 60 to 100° C. for one quarter to 2 hours. The homogeneous reaction product thus obtained is dried in vacuo at 90° C., whereby a yellowish, easily water-soluble product will be obtained.

By introducing thereinto in complex linkage 3.3% of copper by treating the same with copper formate, a product will be obtained which has the property to improve the fastness properties of substantive dyings.

Example 10

9.8 parts of 1-amino-2-hydroxy-3-propyl-piperazinehydrochloride, 4.2 parts of dicyandiamide, 10 parts of 40% formaldehyde and 40 parts of water are mixed together and heated for 20 to 60 minutes to 100° C. The homogeneous product thus obtained is then dried, whereupon a yellowish powder, easily soluble in water, will be obtained. This product increases the fastness properties of substantive dyeings to washing and to perspiration when it is used in the quantity of about 1 part per liter at 70° C.

Example 11

To a solution of 6.3 parts of 1.3-diamino-2-hydroxypropanehydrochloride in 10 parts of water are added 3.25 parts of dicyandiamide and then 10 parts of 40% formaldehyde. The mixture is stirred and heated for 20 to 30 minutes to 70–80° C. After the condensation is finished, the viscous product obtained is dried in vacuo between 60 and 100° C. A product is obtained which can be easily pulverized and which is easily soluble in water. It has the property to increase the fastness of substantive dyeings to perspiration and to soaping, even in the presence of sodium carbonate.

Example 12

6.3 parts of 1.3-diamino-2-hydroxypropanehydrochloride are dissolved in 10 parts of water. To this solution are added 6.5 parts of dicyandiamide and then 20 parts of 40% formaldehyde and heated for 30 minutes at 70–80° C. To this slightly viscous solution are added for instance 4.8 parts of copper chloride dissolved in 10 parts of water. The formation of the copper complex takes place immediately so that, after a short stirring, the reaction product can be dried in vacuo. According to the quantity of the copper salt used, a yellow greenish or a blue-greenish powder, easily soluble in water, will be obtained.

When substantive dyeings are treated with solutions of this product, the same possess improved fastness properties, especially improved fastness properties to washing in the presence of alkali.

What we claim is:

The water-soluble reaction product obtained by the simultaneous interaction of (a) a polyhydroxypropylenepolyamine hydrochloride, prepared from glycerine dichlorhydrine and an excess of ammonia, (b) dicyandiamide, and (c) formaldehyde in an aqueous solution at the boiling point, the ratio of the reactants being approximately one equivalent of the polyamine, $\frac{1}{4}$ mol of dicyandiamide and $\frac{2}{3}$ mol of formaldehyde, the said product being in the dry state a white powder, giving complex compounds with copper and possessing the property of yielding water-insoluble addition products with substantive dyestuffs.

ALFRED RHEINER.
HANS MARTIN HEMMI.

REFERENCES CITED

The following references are of record in the file of this patent:

UNITED STATES PATENTS

| Number | Name | Date |
|---|---|---|
| 1,150,579 | Coutelle et al. | Aug. 17, 1915 |
| 2,121,337 | Brodersen et al. | June 21, 1938 |
| 2,142,688 | Brodersen et al. | Jan. 3, 1939 |
| 2,143,388 | Schlock | Jan. 10, 1939 |
| 2,213,474 | Puetzer | Sept. 3, 1940 |
| 2,223,935 | Daniels et al. | Dec. 3, 1940 |
| 2,256,278 | D'Alelio | Sept. 16, 1941 |
| 2,257,239 | Krzikalla et al. | Sept. 30, 1941 |
| 2,258,321 | Ereiks | Oct. 7, 1941 |
| 2,265,944 | Laughorst et al. | Dec. 9, 1941 |
| 2,272,783 | Treboux | Feb. 10, 1942 |
| 2,317,184 | Dreyfuss | Apr. 20, 1943 |
| 2,320,225 | Ereiks | May 25, 1943 |
| 2,366,129 | Rust | Dec. 26, 1944 |
| 2,371,100 | Kaiser et al. | Mar. 6, 1945 |
| 2,418,696 | Cameron et al. | Apr. 8, 1947 |